BEST AVAILABLE COPY
X-9,235
I. TURK.
Smut Mill.
Patented November 7, 1835.
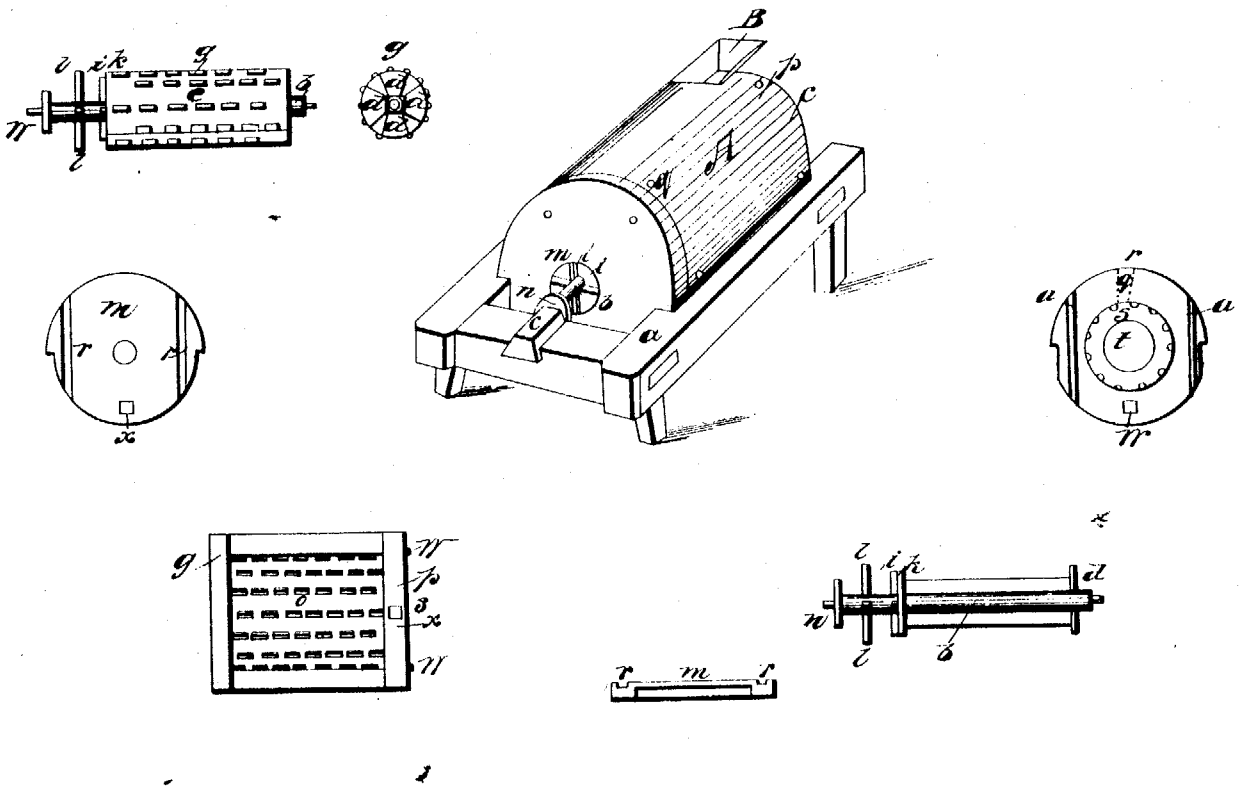
N. PETERS, Photo-Lithographer, Washington, D. C.

John Turk
Letters Patent
11-7-1835

The schedule referred to in these Letters Patent and making part of the same containing a description in the words of the said John Turk himself of his improvement in the Smut Machine

---

Be it known that I John Turk of the Town of Columbus in the County of Warren and State of Pennsylvania have made a new and useful improvement in the useful arts being a machine for separating Smut from grain called "Turks Smut Machine" which is described as follows reference being had to the annexed drawings of the same making part of this specification Upon a strong frame, a, inclining at an angle of about 10 degrees with the Horizon turns a, shaft .b. on gudgeons in blocks or boxes, c, let into the end pieces of the frame by dove tailed grooves and tenons, around which shaft are arranged spirally a number of wings, d, for producing a current of air in the inside of a sheet iron drum e, which surrounds the shaft b, and wings d, but does not touch them, except those at the upper end which are arranged in a manner similar to the bits of a screw auger in order to gather the air into the drum from whence it is forced through apertures g, punched in the sheet iron drum which apertures are in rows all around the drum; four arms let into the shaft support this end of the drum, the lower end i, being closed by a solid head of wood, k, At the lower end of the drum are four or more wings l, let into the shaft and revolving within a thin fan case, m, keyed into the frame and on the end of the shaft is a pulley n, by which it is turned. Surrounding this drum is a stationary cylindrical sheet iron case, o, punched in a similar manner to the revolving drum, but in a contrary direction to those in the drum these being punched from the centre whilst those in the case are punched towards it thus bringing their rough surfaces about three quarters of an inch from each other. The holes should be punched large enough to permit cheat cockle and other small seeds to escape through them. The ends of the cylindrical case are supported by circular rims p, q, let into mortises

9235X tins in the side pieces of the frame secured by wedges, the upper one p, having an aperture r. through it to admit the grain to pass between the revolving drum, and stationary case being also covered at the end with a sheet iron cap. S. except an opening t. in the centre as large as the circle of the spirally placed wings left for the passage of the air into the drum, the other rim q. has two ribs, u, on its outer side fitting into grooves in the fan case v. which case closes the lower end of the cylindrical case At the end of the cylindrical case and through the rim is an aperture w. communicating with another aperture x. in the bottom of the fan case having a branch aperture from the before mentioned aperture running vertically and at right angles with a horizontal aperture in the rim — the vertical aperture being for the discharge of the cleaned grain into a receiver below and the horizontal opening being for the escape of the chaff or dirt which is separated from the grain as it meets the current of air created by the wings within the fan case; The upper half of the stationary cylindrical case is covered with a plain cap A. of wood or sheet iron nailed to the rims to prevent inconvenience from dust having an aperture in it corresponding with the one in the upper rim for the reception of the end of a hopper B. which is placed over this opening to receive the grain. The cylinder or revolving drum has oblong openings in it at the lower end made where the sheets of iron come together for the purpose of suffering any grain to pass out that may have insinuated itself during the operation of the machine and which opening should be made in the same direction that the cylinder revolves for the more easy cleaning itself of the same. The machine being put in operation by the band from the driving power passing around the pulley on the end of the shaft, the grain to be cleaned from smut is put into the hopper from whence it passes along the opening or spout in the rim and enters between the revolving drum, and stationary case, the rough surfaces of which coming nearly together break the smut and scrape the grain at the same time the current of air caused by the spirally placed wings on the shaft and the straight wings in the centre of the drum, forces the air through the punched holes, in the drum and case and and case and carries off the smut and other dirt through these open-
ings the grain descending to the lower end of the cylindrical case pass-
es through the aperture in the rim and meets the current of air from the
fan on the lower end of the shaft at the point where the vertical aper-
ture crosses the horizontal one, the remaining dirt being driven through
the horizontal aperture out of the Machine, whilst the clean grain falls
into the receiver below, the Machine is geared so as to have from five to
six hundred revolutions per minute. What I claim as my invention
and never before known is the before described machine for separating
smut from grain particularly the shaft and spirally arranged wings
for causing a current of air within the revolving drum operating in
the manner and for the purposes herein set forth Ex.
[illegible]

Witnesses
Jos. B. Wood
Wm. P. Elliot

John Turk

1036 Words]

(Drawing)